Feb. 3, 1959　　　TOMIHEI SAKAGAMI　　　2,871,710
DRIVING MECHANISM CAPABLE OF TRANSMITTING
SWINGING AND FEATHERING MOTIONS
Filed March 7, 1955　　　　　　　　　2 Sheets-Sheet 1

Inventor
T. Sakagami
By Glascock Downing Seebold
Attys.

Feb. 3, 1959 TOMIHEI SAKAGAMI 2,871,710
DRIVING MECHANISM CAPABLE OF TRANSMITTING
SWINGING AND FEATHERING MOTIONS
Filed March 7, 1955 2 Sheets-Sheet 2

Inventor
T Sakagami
By Hancock Downing Seibold
Attys

United States Patent Office 2,871,710
Patented Feb. 3, 1959

2,871,710

DRIVING MECHANISM CAPABLE OF TRANSMITTING SWINGING AND FEATHERING MOTIONS

Tomihei Sakagami, Meguro-ku, Tokyo-to, Japan

Application March 7, 1955, Serial No. 492,629

Claims priority, application Japan January 24, 1955

6 Claims. (Cl. 74—70)

This invention relates to a driving mechanism capable of transmitting simultaneously swinging and feathering motions.

The object of this invention is to provide a mechanism which can effectively transmit a motive power capable of giving simultaneously swinging and feathering motions.

Further object of this invention is to provide a driving mechanism capable of transmitting effectively a motive power for agitating any liquid.

A further object of this invention is to provide a driving mechanism capable of transmitting very effectively a motive power for propelling ship, helicopter or any other device which requires swinging and feathering motions.

Said objects and other objects of this invention have been accomplished by a mechanism which comprises a driving motor, a driving shaft driven by said motor, a transmitting shaft which transmits motive power, the center line of said transmitting shaft being in a vertical plane containing the center line of said driving shaft, and a crank supported by free end of said driving shaft so that the center lines of crank pin and driving shaft intersect each other at an angle between 0° and 90°, said driving and transmitting shafts being connected through said crank so that said transmitting shaft can be given swinging and feathering motions by rotation of said driving shaft in a direction.

The principle and example of this invention will be described in connection with the accompanying drawings; wherein Fig. 1 is a perspective view for describing the principal mechanism of this invention.

Figure 1:
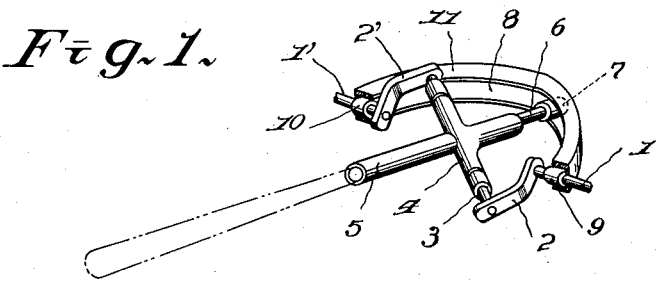

In the principal mechanism shown in Fig. 1, a crank 2 is supported by a free end of a driving shaft 1 which in turn is supported by a bearing 9 of a frame 11 so that the center line of the crank pin 3 and the center line of said driving shaft intersect each other at an angle between 0° and 90°.

A transmitting shaft 5 is attached to a sleeve 4 which is rotatably supported by the crank pin 3 so that the longitudinal axis of said shaft is in a plane perpendicular to the center line of said crank pin 3. On one end part 6 of said shaft 5 is supported a roller or ball 7 so as to rotate around the axis of said shaft.

The frame 11 is provided with a guide slot 8 for guiding said roller or ball 7, said slot being in a horizontal plane containing the center line of the driving shaft. The crank 2' and guide shaft 1' are the same as crank 2 and shaft 1 and are arranged at the positions symmetrical to the positions of said crank 2 and shaft 1, said shaft 1' being supported by a bearing 10. Said shaft 1' may be used as an auxiliary driving shaft by driving it with a speed synchronous to that of said shaft 1.

In the mechanism shown in Fig. 1, when the driving shaft 1 is rotated in a direction, the transmitting shaft 5 swings along an arcuate path having a center point which is a cross point of the center lines of the crank pin 3 and the driving shaft 1. At the same time with said swinging motion, said transmitting shaft 5 will be given a feathering motion, because the sleeve 4 is given a feathering motion by the inclined crank 2 during rotation thereof.

Figure 5:
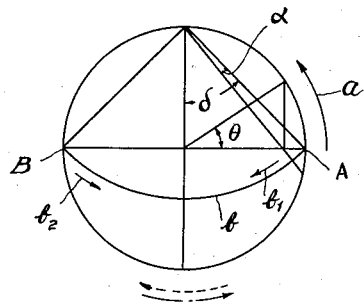
Fig. 5 is a diagram for describing the swinging motion of the mechanism shown in Fig. 1.

In the diagram of Fig. 5 is diagrammatically shown a swinging motion of the transmitting shaft 5 and a crank motion during one rotation of the crank 2 in the case of existence of an angular difference of 45° between the center line of the crank pin 3 and the center line of the driving shaft 1.

In Fig. 5, the circle denotes the locus of crank head, the rotary direction thereof being designated by the arrow line $a$, and the arcuate line $b$ denotes the swinging locus of the transmitting shaft 5, the forward locus and backward locus of said swinging locus being denoted by arrow lines $b_1$ and $b_2$, respectively.

When the point A is taken as the starting point, the transmitting shaft 5 travels forward along the line $b$ to the point B during first half rotation of the crank head and travels backward along the line $b$ to the point A during next half rotation of the crank head, so that the transmitting shaft 5 does one reciprocal swinging motion during one rotation of the crank, maximum swing angle of said swinging motion being corresponding to the half rotation of the crank.

The relation between the swinging angle $\alpha$ of the transmitting shaft and the rotation angle of the crank can be given by the following equation, as is clear in Fig. 5

$$\alpha = \delta - \tan^{-1} \cos\theta \tan\delta$$

if $$\delta = 45°$$
$$\alpha = 45° - \tan^{-1} \cos\theta$$

In said equation, $\theta$ is a crank angle, $\alpha$ is a swing angle of the transmitting shaft from the starting point A in Fig. 5, $\delta$ is an angle between the center line of the crank pin 3 and the center line of the driving shaft 1.

Figure 6:
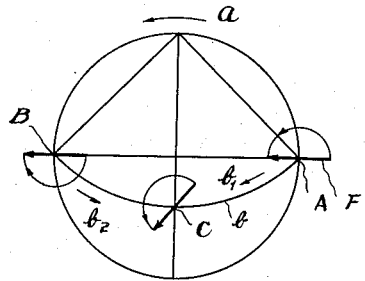
Figs. 6 and 7 are diagrams for describing the feathering motion of the mechanism shown in Fig. 1.
Figure 7:
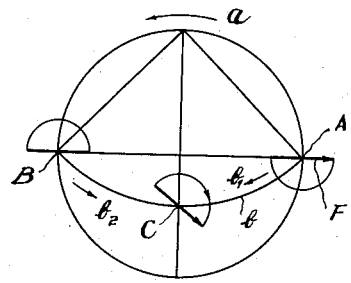

In Figs. 6 and 7 are shown a feathering motion of the transmitting shaft 5, wherein circle, arcuate line $b$, arrow lines $a$, $b_1$, $b_2$ and points A and B are same with those in Fig. 5, each of said Figs. 6 and 7 being corresponding to feathering motion during forward and backward swinging motions, respectively.

In Fig. 6, feathering angle of the transmitting shaft 5 is zero at the starting point A, the feathering direction of said shaft 5 being denoted by F in Figs. 6 and 7, but said angle increases gradually counter-clockwise with the progress of said swinging motion and becomes maximum value of 45° at the intermediate point C. After passing said point C, said angle reduces gradually clockwise and becomes zero at the point B. In the back swinging motion of the transmitting shaft from the point B, feathering motion of said shaft is carried out in the reverse relation to that of said forward swinging motion, the feathering direction in said back swinging motion being denoted in Fig. 7.

Figure 8:
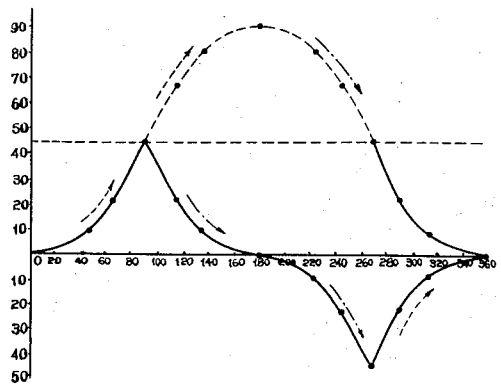
Fig. 8 is a view of characteristic curves for describing the transition of the swinging and feathering motions in Figs. 6 and 7.

In Fig. 8 are shown characteristic curves showing the swinging and feathering motions described in connection with the Figs. 5, 6 and 7.

In Fig. 8, the abscissa is plotted angle of the crank 2 during one rotation thereof and in the vertical axis are plotted swinging and feathering angles. The broken and full curves show the relation between the rotary angle of the crank 2 and the swing angle of the transmitting shaft 5 and the relation between the rotary angle of the crank 2 and the feathering angle of the transmitting shaft 5, respectively.

In said broken curve, the broken arrow line shows the forward stroke and the chain arrow line shows the backward stroke. On the other hand, in said full curve, broken arrow line shows the counter-clockwise feathering motion and the chain arrow line shows the clockwise feathering motion.

The mechanism of Fig. 1 can be effectively applied for various objects, because a motive power capable of giving swinging and feathering motions can be effectively transmitted, as described above. For example, when a propeller is fixed to the free end of the transmitting shaft 5 as shown in Fig. 1 by chain line, propelling force is effectively generated, so that it can be used as a power transmitting mechanism for an agitator or for propelling device of ship or helicopter.

Figure 2:
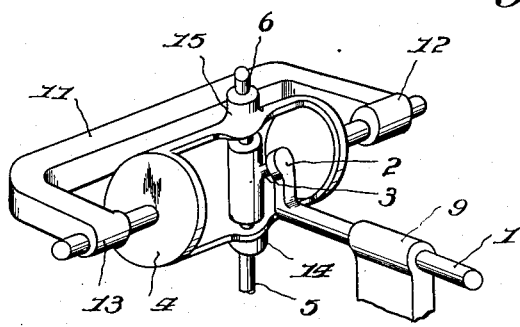
Fig. 2 is a perspective view of an example of this invention.
Figures 3, 4:
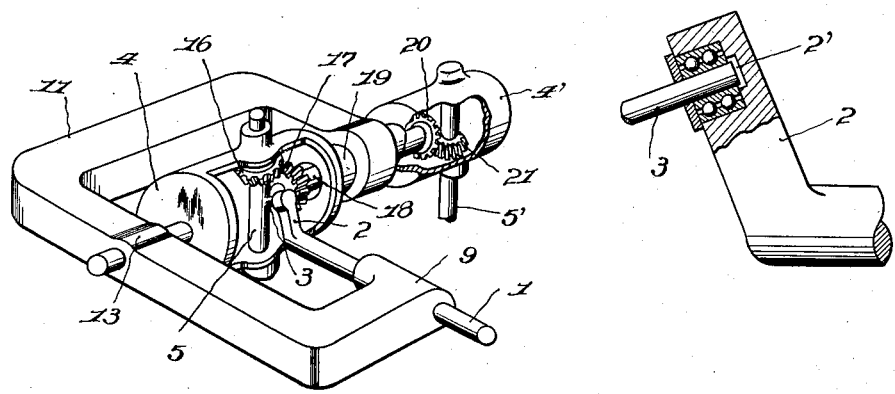
Fig. 3 is a sectional side view of a part of the example in Fig. 2.
Fig. 4 is a perspective view of another example of this invention.

The principal mechanism shown in Fig. 1 relates to a double crank system, but the principal idea of this invention can be embodied by using a single crank system. Such mechanism is shown in Figs. 2 and 3, wherein same numerals as those in Fig. 1 denote the same parts. In said example, the crank 2 is supported by the driving shaft 1 at an angle so that the center line of the crank pin 3 may be perpendicular to the center line of the transmitting shaft 5, said shaft 1 being supported by a shaft extending outwardly from each end of the cylinder, and with the respective shafts slidably fitted in a bearing 9. The sleeve 4 is in the nature of a cylinder having a window and is supported by a shaft extending outwardly from each end of the cylinder, and with the respective shafts slidably fitted in the bearings 12 and 13 of a frame 11 so as to be swung around the center axis of said sleeve within a limit of a suitable angle.

A transmitting shaft 5 is rotably supported by the bearings 14 and 15 so that the center line of said shaft may be perpendicular to the center axis of said sleeve 4, said bearings 14 and 15 being suported by the surface wall of said sleeve at diametrically opposite points.

The free end of the crank pin 3 is slidably fitted in a hollow part 2' of the crank head of the crank 2 through a ball bearing.

In the mechanism shown in Figs. 2 and 3, the sleeve 4 can swing around the center axis thereof, the transmitting shaft 5 is rotatably supported by the bearings 14 and 15 so that the center line of said shaft is perpendicular of the center axis of said sleeve 4 and the crank pin 3 is slidably fitted in the hollow part of the crank head, so that when the driving shaft 1 is rotated in a direction, the crank pin 3 can take a spherical motion, whereby the transmitting shaft 5 is given such feathering and swinging motions as in the case of the mechanism in Fig. 1 through crank 2 by the driving shaft.

The mechanism in Figs. 2 and 3 may be modified as in the mechanism in Fig. 4 wherein same numerals as those in Fig. 2 denote the same parts and instead of direct utilization of the swinging and feathering motions of the transmitting shaft 5, swinging and feathering motions of another transmitting shaft 5' which is similar to said shaft 5 are utilized for transmitting motive power. Said shaft 5' is rotatably supported in parallel to said shaft 5 by a cylinder 4' which is supported by the shaft 19 of the sleeve 4. More specifically, the shaft 19 is hollow and is of greater diameter than the shaft journalled in the bearing 13, and a water tight seal is effected between the shaft and the frame 11. Bevel gears 16 and 21 are fixed to the shafts 5 and 5', respectively, said gears being connected by a bevel gear 17 which is in mesh with the gear 16, shaft 18 is supported in said shaft 19 and a bevel gear 20 which is in mesh with the gear 21.

According to the example of Fig. 4, the shaft 5' is given such swinging motion due to swinging of the cylinder 4' and a feathering motion due to rotation of the gear 21 as in the case of the shaft 5.

Said example is very effective for actual employment, because it is very easy to construct the part of the shaft 5' which transmits directly the motive power as a watertight mechanism.

In the mechanisms illustrated in Figs. 1–4, when a propeller of a suitable form is attached to any one or both free ends of the transmitting shaft 5 or 5' and said propeller is immersed in a liquid chamber, then the liquid in said chamber is forcibly subjected to a cubic agitation due to swinging and feathering motions of said propeller, so that an ideal agitation can be obtained, whereby the reaction of the liquid in the chamber may be uniformly carried out and the character of the reaction product and reaction efficiency will be remarkably improved. On the other hand, when a brush or the like of a suitable form is attached to said shaft, it may be effectively utilized as a window wiper of motor car and particularly as a snow remover on the road or sand remover of bulldozer.

Furthermore, when the mechanism of this invention provided with a propeller which is attached to the transmitting shaft is used as the propelling device of ship or helicopter, the vertical component of the propelling force may be reduced as much as possible and only the propelling force necessary for impelling ship or helicopter becomes effective. According to such propelling device as described above, rudder is unnecessary, because it is possible to change impelling direction by changing the direction of the frame of the mechanism. Moreover, propeller shaft, shaft bracket, propeller boss etc. which accompany additional resistances are not necessary.

Furthermore, there is no apprehension that any sea or water plants are wound around the propeller, because the propeller makes a feathering motion instead of continuously rotary motion of usual propeller.

Since it is obvious that many changes and modifications can be made in the above described details without departing from the nature and spirit of this invention, it is not limited within said illustration.

I claim:

1. In a driving mechanism capable of transmitting simultaneous swinging and feathering motions, a driving shaft, a crank pin inclined at an angle to the center line of the driving shaft, a crank arm connecting the crank pin to the driving shaft, a transmitting shaft for transmitting feathering and swinging motions, a sleeve loosely associated with the crank pin, the transmitting shaft being secured to the sleeve whereby the sleeve converts the motion of the crank pin into swinging and feathering motions of the transmitting shaft, and a guide member operative to effect said swinging motion only in the plane containing the driving shaft.

2. In a driving mechanism capable of transmitting simultaneous swinging and feathering motions, a driving shaft, a crank arm connected to the driving shaft, a crank pin rigidly fixed to the crank arm at an angle to the axis of the driving shaft, a sleeve loosely associated with the crank pin, a transmitting shaft directly secured to the sleeve so as to define a right angle between the central axis of said shaft and the central axis of the sleeve whereby the transmitting shaft may effect a feathering motion about the longitudinal axis of said shaft as well as a swinging motion within an angle in the plane containing the driving shaft while maintaining an angular relation against the rotation of the driving shaft, a blade secured to one end of the transmitting shaft, a guide member carried by the other end of the transmitting shaft, and an arcuate guide means cooperable with the guide member whereby the transmitting shaft may effect said feathering and swinging motions.

3. A driving mechanism as set forth in claim 2 including two driving shafts, a crank arm connected to each driving shaft, and a crank pin connected to each crank arm at an angle to the axes of the driving shafts, with said sleeve loosely associated with said crank pins.

4. In a driving mechanism capable of transmitting simultaneous swinging and feathering motions, a driving shaft, a guide shaft, a crank arm connected to the driving shaft, bearing means for the guide shaft, a crank arm secured to the guide shaft, crank pins rigidly fixed to the respective crank arms at an angle to the axes of the driving and guide shafts, a sleeve loosely associated with the crank pins, a transmitting shaft directly attached to the sleeve so as to define a right angle between the central axis of said shaft and the central axis of the sleeve whereby the transmitting shaft may effect a feathering motion about the longitudinal axis of said shaft as well as a swinging motion within an angle in the plane containing said driving shaft while maintaining an angular relation against the rotation of the driving shaft, a blade secured to one end of the transmitting shaft, a guide member carried by the other end of the transmitting shaft and an arcuate guide means cooperable with the guide member whereby the transmitting shaft may effect said feathering and swinging motions.

5. In a driving mechanism capable of transmitting simultaneous swinging and feathering motions, a driving shaft, a crank arm connected to the driving shaft, means defining a hollow part in the free end of the crank arm, a crank pin loosely engaged in said hollow part, a transmitting shaft secured to the pin so that the longitudinal axis of the transmitting shaft and the axis of the driving shaft cross each other so as to define a right angle between the longitudinal axis of the transmitting shaft and the axis of said pin at the cross-over position, a frame, a cylindrical sleeve having an opening therein, a supporting shaft extending outwardly from each end of the sleeve in the direction of the axis of the sleeve, the central axis of the sleeve crossing over the longitudinal central axis of the driving shaft at a right angle, said last named cross-over point coinciding with the cross-over point between the center line of the transmitting shaft and the center line of the crank pin, bearings on the frame in which the supporting shafts of the sleeve are mounted for free rotation, and diametrically opposed bearings on the sleeve in which the transmission shaft rotates freely whereby the transmitting shaft may effect a feathering motion about the longitudinal axis of the transmitting shaft as well as a swinging motion within an angle in the plane containing the driving shaft while maintaining an angular relation against the rotation of the driving shaft.

6. In a driving mechanism capable of transmitting simultaneous swinging and feathering motions, a driving shaft, a crank arm connected to the driving shaft, means defining a hollow part in the free end of the crank arm, a crank pin loosely engaged in the hollow part, a transmitting shaft secured to the pin so that the longitudinal axis of the transmitting shaft and the axis of the driving shaft cross each other so as to define a right angle between the longitudinal axis of the transmitting shaft and the axis of the pin at the cross-over position, a frame, a cylindrical sleeve having an opening therein, a supporting shaft extending outwardly from each end of the sleeve in the direction of the axis of the sleeve, the central axis of the sleeve crossing over the longitudinal central axis of the driving shaft at a right angle, the last named cross-over point coinciding with the cross-over point between the center line of the transmitting shaft and the center line of the crank pin, bearings on the frame in which said supporting shafts of the sleeve are loosely mounted for free rotation, diametrically opposed bearings on the cylindrical sleeve in which the transmitting shaft rotates freely whereby the transmitting shaft may effect a feathering motion about the longitudinal axis of the transmitting shaft as well as a swinging motion within an angle in the plane containing the driving shaft while maintaining an angular relation against the rotation of the driving shaft, the diameter of one of the shafts being greater than that of the other shaft and having a hollow part therein, a cylinder fixed to the other end of the hollow part, means defining a seal between the frame and the shaft having the hollow part, a second transmitting shaft, diametrically opposed bearings attached to the cylinder in which bearings the second transmitting shaft is journalled, with the first and second transmitting shafts being in parallelism, an inner shaft extending into the sleeve and the hollow part, a bevel gear fixed to each end of the inner shaft, and complemental bevel gears in said first and second transmitting shafts meshing with the gears on the ends of the inner shaft so that the second transmitting shaft may effect feathering and swinging motions corresponding to those of the first transmitting shaft.

References Cited in the file of this patent
UNITED STATES PATENTS

| | | |
|---|---|---|
| 1,075,308 | Skinner | Oct. 7, 1913 |
| 2,557,912 | Lane | June 19, 1951 |

FOREIGN PATENTS

| | | |
|---|---|---|
| 281,842 | Switzerland | July 1, 1952 |